US009338650B2

(12) United States Patent
Stein et al.

(10) Patent No.: US 9,338,650 B2
(45) Date of Patent: May 10, 2016

(54) APPARATUS FOR COOPERATING WITH A MOBILE DEVICE

(71) Applicants: Zeev Stein, Holon (IL); Ran Rahav, Tel-Aviv (IL); Meir Schreiber, Maccabim (IL); Baruch Altman, Pardes Hana (IL)

(72) Inventors: Zeev Stein, Holon (IL); Ran Rahav, Tel-Aviv (IL); Meir Schreiber, Maccabim (IL); Baruch Altman, Pardes Hana (IL)

(73) Assignee: LiveU Ltd., Kfar Saba (IL)

( * ) Notice: Subject to any disclaimer, the term of this patent is extended or adjusted under 35 U.S.C. 154(b) by 237 days.

(21) Appl. No.: 14/199,324

(22) Filed: Mar. 6, 2014

(65) Prior Publication Data

US 2014/0269553 A1    Sep. 18, 2014

Related U.S. Application Data

(60) Provisional application No. 61/784,630, filed on Mar. 14, 2013.

(51) Int. Cl.
| | |
|---|---|
| *G06F 1/16* | (2006.01) |
| *H04W 12/06* | (2009.01) |
| *H04W 4/00* | (2009.01) |
| *H04M 1/725* | (2006.01) |
| *H04W 12/08* | (2009.01) |

(52) U.S. Cl.
CPC ............. *H04W 12/06* (2013.01); *G06F 1/1632* (2013.01); *G06F 1/1635* (2013.01); *G06F 1/1637* (2013.01); *H04M 1/72527* (2013.01); *H04W 4/008* (2013.01); *G06F 1/163* (2013.01); *H04M 2250/52* (2013.01); *H04W 12/08* (2013.01)

(58) Field of Classification Search
CPC ... G06F 1/1613; G06F 1/1656; G06F 1/1632; G06F 1/1635; G06F 1/1637
See application file for complete search history.

(56) References Cited

U.S. PATENT DOCUMENTS

| | | | |
|---|---|---|---|
| 5,280,470 | A | 1/1994 | Buhrke et al. |
| 5,699,413 | A | 12/1997 | Sridhar |
| 5,771,229 | A | 6/1998 | Gavrilovich |

(Continued)

FOREIGN PATENT DOCUMENTS

| | | |
|---|---|---|
| EP | 1 863 304 A1 | 12/2007 |
| EP | 2 824 945 | 1/2015 |

(Continued)

OTHER PUBLICATIONS

International Application PCT/IB2013/053843 Search Report dated Aug. 21, 2013.

(Continued)

*Primary Examiner* — Raj Jain
(74) *Attorney, Agent, or Firm* — Finnegan, Henderson, Farabow, Garrett & Dunner, L.L.P.

(57) ABSTRACT

An apparatus for cooperating with a mobile device having an embedded transceiver is disclosed. The apparatus includes a housing and a mechanical connector on the housing, the mechanical connector being configured to mechanically retain the mobile device. At least one port within the housing conveys energy to at least one auxiliary wireless transceiver associable with the apparatus. The apparatus is configured to cooperate with the mobile device when the mobile device is retained on the housing by the mechanical connector, to enable transmission of a first portion of a data stream over the at least one auxiliary transceiver while a second portion of the data stream is simultaneously transmitted over the embedded transceiver.

23 Claims, 6 Drawing Sheets

(56) References Cited

U.S. PATENT DOCUMENTS

| | | | |
|---|---|---|---|
| 6,154,637 A | 11/2000 | Wright et al. | |
| 6,253,247 B1 | 6/2001 | Bhaskar et al. | |
| 6,288,753 B1 | 9/2001 | DeNicola et al. | |
| 6,496,477 B1 | 12/2002 | Perkins et al. | |
| 6,510,553 B1 | 1/2003 | Hazra | |
| 6,647,015 B2 | 11/2003 | Malkemes et al. | |
| 6,683,877 B1 | 1/2004 | Gibbs et al. | |
| 6,754,872 B2 | 6/2004 | Zhang et al. | |
| 6,757,256 B1 | 6/2004 | Anandakumar et al. | |
| 6,774,926 B1 | 8/2004 | Ellis et al. | |
| 6,785,330 B1 | 8/2004 | Whealton et al. | |
| 6,788,686 B1 | 9/2004 | Khotimsky et al. | |
| 6,831,574 B1 | 12/2004 | Mills et al. | |
| 6,842,446 B2 | 1/2005 | Everson et al. | |
| 6,904,049 B1 | 6/2005 | Maeda | |
| 6,963,279 B1 | 11/2005 | Martinelli et al. | |
| 6,987,732 B2 | 1/2006 | Gracon et al. | |
| 6,999,432 B2 | 2/2006 | Zhang et al. | |
| 7,013,354 B1 | 3/2006 | Beck et al. | |
| 7,027,415 B1 | 4/2006 | Dahlby et al. | |
| 7,039,930 B1 | 5/2006 | Goodman et al. | |
| 7,082,221 B1 | 7/2006 | Jiang | |
| 7,151,762 B1 | 12/2006 | Ho et al. | |
| 7,237,032 B2 | 6/2007 | Gemmell | |
| 7,237,033 B2 | 6/2007 | Weigand et al. | |
| 7,292,571 B2 | 11/2007 | Brown | |
| 7,317,750 B2 | 1/2008 | Shattil | |
| 7,324,491 B1 | 1/2008 | Benveniste et al. | |
| 7,340,764 B2 | 3/2008 | Kubota et al. | |
| 7,542,456 B2 | 6/2009 | Garg et al. | |
| 7,551,671 B2 | 6/2009 | Tyldesley et al. | |
| 7,738,391 B2 | 6/2010 | Melpignano et al. | |
| 7,894,807 B1 | 2/2011 | Drennan | |
| 7,948,933 B2 | 5/2011 | Ohayon et al. | |
| 8,165,044 B2 | 4/2012 | Mahajan | |
| 8,204,085 B1 | 6/2012 | Courtney et al. | |
| 8,467,337 B1 | 6/2013 | Ohayon et al. | |
| 8,488,659 B2 | 7/2013 | Ohayon et al. | |
| 8,649,402 B2 | 2/2014 | Ohayon et al. | |
| 8,737,436 B2 | 5/2014 | Ohayon et al. | |
| 8,787,966 B2 | 7/2014 | Altman et al. | |
| 8,942,179 B2 | 1/2015 | Ohayon et al. | |
| 8,964,646 B2 | 2/2015 | Ohayon et al. | |
| 2002/0040479 A1 | 4/2002 | Ehrman et al. | |
| 2002/0054578 A1 | 5/2002 | Zhang et al. | |
| 2002/0071393 A1 | 6/2002 | Musoll | |
| 2002/0143565 A1 | 10/2002 | Headings et al. | |
| 2002/0146232 A1 | 10/2002 | Harradine et al. | |
| 2002/0154703 A1 | 10/2002 | Kubota et al. | |
| 2002/0174434 A1 | 11/2002 | Lee et al. | |
| 2002/0176482 A1 | 11/2002 | Chien | |
| 2003/0002577 A1 | 1/2003 | Pinder | |
| 2003/0009717 A1 | 1/2003 | Fukushima et al. | |
| 2003/0016770 A1 | 1/2003 | Trans et al. | |
| 2003/0046708 A1 | 3/2003 | Jutzi | |
| 2003/0051041 A1 | 3/2003 | Kalavade et al. | |
| 2003/0055971 A1 | 3/2003 | Menon | |
| 2003/0061503 A1 | 3/2003 | Katz et al. | |
| 2003/0074554 A1 | 4/2003 | Roach et al. | |
| 2003/0146940 A1 | 8/2003 | Ellis et al. | |
| 2003/0159143 A1 | 8/2003 | Chan | |
| 2003/0174733 A1 | 9/2003 | Kawai et al. | |
| 2004/0013192 A1 | 1/2004 | Kennedy | |
| 2004/0023652 A1 | 2/2004 | Shah et al. | |
| 2004/0025186 A1 | 2/2004 | Jennings et al. | |
| 2004/0098748 A1 | 5/2004 | Bo et al. | |
| 2004/0133907 A1 | 7/2004 | Rodriquez et al. | |
| 2004/0133917 A1 | 7/2004 | Schilling | |
| 2004/0135879 A1 | 7/2004 | Stacy et al. | |
| 2004/0177155 A1 | 9/2004 | Enokida et al. | |
| 2004/0180696 A1 | 9/2004 | Foore et al. | |
| 2005/0034155 A1 | 2/2005 | Gordon et al. | |
| 2005/0035368 A1 | 2/2005 | Bunyk | |
| 2005/0041586 A1 | 2/2005 | Jiang | |
| 2005/0047363 A1 | 3/2005 | Jiang | |
| 2005/0105815 A1 | 5/2005 | Zhang et al. | |
| 2005/0122914 A1 | 6/2005 | Durso et al. | |
| 2005/0125670 A1 | 6/2005 | Sozzani et al. | |
| 2005/0163093 A1 | 7/2005 | Garg et al. | |
| 2005/0183109 A1 | 8/2005 | Basson et al. | |
| 2005/0265383 A1 | 12/2005 | Melpignano et al. | |
| 2005/0280398 A1* | 12/2005 | Lee | H01M 10/46 320/134 |
| 2006/0015917 A1 | 1/2006 | Rozental | |
| 2006/0015924 A1 | 1/2006 | Kortum et al. | |
| 2006/0062242 A1 | 3/2006 | Dacosta | |
| 2006/0062243 A1 | 3/2006 | Dacosta | |
| 2006/0085551 A1 | 4/2006 | Xie et al. | |
| 2006/0088092 A1 | 4/2006 | Chen et al. | |
| 2006/0105722 A1* | 5/2006 | Kumar | G06F 1/1632 455/90.3 |
| 2006/0146831 A1 | 7/2006 | Argyropoulos et al. | |
| 2006/0221846 A1 | 10/2006 | Dyck et al. | |
| 2006/0264184 A1 | 11/2006 | Li et al. | |
| 2006/0274773 A1 | 12/2006 | Cohen et al. | |
| 2007/0064949 A1 | 3/2007 | Choi et al. | |
| 2007/0083899 A1 | 4/2007 | Compton et al. | |
| 2007/0098007 A1 | 5/2007 | Prodan et al. | |
| 2007/0121678 A1 | 5/2007 | Brooks et al. | |
| 2007/0136777 A1 | 6/2007 | Hasek et al. | |
| 2007/0140455 A1 | 6/2007 | Zhao | |
| 2007/0204321 A1 | 8/2007 | Shen et al. | |
| 2007/0207832 A1 | 9/2007 | Gerardi et al. | |
| 2007/0230475 A1 | 10/2007 | Langner | |
| 2007/0247515 A1 | 10/2007 | Roman | |
| 2007/0263072 A1 | 11/2007 | Lochbaum et al. | |
| 2007/0268876 A1 | 11/2007 | Yellin et al. | |
| 2008/0025210 A1 | 1/2008 | Honary et al. | |
| 2008/0034396 A1 | 2/2008 | Lev | |
| 2008/0049723 A1 | 2/2008 | Bill et al. | |
| 2008/0120676 A1 | 5/2008 | Morad et al. | |
| 2008/0247745 A1* | 10/2008 | Nilsson | H04N 5/232 396/322 |
| 2008/0295159 A1 | 11/2008 | Sentinelli | |
| 2008/0310371 A1 | 12/2008 | Russell | |
| 2009/0006848 A1 | 1/2009 | Adrangi et al. | |
| 2009/0138925 A1 | 5/2009 | Headings et al. | |
| 2009/0163175 A1 | 6/2009 | Shi et al. | |
| 2009/0270129 A1 | 10/2009 | Kuo et al. | |
| 2010/0045791 A1 | 2/2010 | Drive et al. | |
| 2010/0210304 A1 | 8/2010 | Huslak | |
| 2010/0227588 A1 | 9/2010 | Bradley | |
| 2010/0248690 A1 | 9/2010 | Biggs et al. | |
| 2010/0273424 A1 | 10/2010 | De Petris et al. | |
| 2010/0311391 A1 | 12/2010 | Siu et al. | |
| 2010/0311402 A1 | 12/2010 | Srinivasan | |
| 2010/0311468 A1 | 12/2010 | Shi et al. | |
| 2010/0322259 A1 | 12/2010 | Garg et al. | |
| 2011/0007693 A1 | 1/2011 | Frusina et al. | |
| 2011/0028135 A1 | 2/2011 | Srinivasan | |
| 2011/0051642 A1 | 3/2011 | Krishnaswamy | |
| 2011/0059773 A1 | 3/2011 | Neumann et al. | |
| 2011/0081951 A1 | 4/2011 | Hwang | |
| 2011/0115976 A1 | 5/2011 | Ohayon | |
| 2011/0117909 A1 | 5/2011 | Cao et al. | |
| 2011/0151858 A1 | 6/2011 | Lai | |
| 2011/0154460 A1 | 6/2011 | Khare et al. | |
| 2011/0269456 A1 | 11/2011 | Krishnaswamy et al. | |
| 2012/0021744 A1 | 1/2012 | Chin et al. | |
| 2012/0055231 A1 | 3/2012 | Odendall | |
| 2012/0135715 A1 | 5/2012 | Kang et al. | |
| 2012/0195259 A1 | 8/2012 | Ohayon et al. | |
| 2012/0219085 A1 | 8/2012 | Long et al. | |
| 2013/0029720 A1 | 1/2013 | Clevorn | |
| 2013/0094522 A1 | 4/2013 | Moshfeghi | |
| 2013/0155231 A1 | 6/2013 | Ohayon et al. | |

(56) References Cited

U.S. PATENT DOCUMENTS

| | | | |
|---|---|---|---|
| 2013/0329639 A1 | 12/2013 | Wietfeldt et al. | |
| 2014/0269553 A1* | 9/2014 | Stein .................. | H04M 1/72527 370/329 |
| 2015/0124752 A1 | 5/2015 | Ohayon et al. | |

FOREIGN PATENT DOCUMENTS

| | | |
|---|---|---|
| GB | 2428529 | 1/2007 |
| JP | 2002-010332 | 1/2002 |
| JP | 2002-344965 | 11/2002 |
| JP | 2003-152787 | 5/2003 |
| JP | 2005-065207 | 3/2005 |
| JP | 2014-030235 | 2/2014 |
| WO | WO-02-063501 | 8/2002 |
| WO | WO-02-089519 | 11/2002 |
| WO | WO-03-098850 | 11/2003 |
| WO | WO-2005-060300 | 6/2005 |
| WO | WO-2005-109789 | 11/2005 |
| WO | WO-2009-093252 | 7/2009 |
| WO | WO-2011-075739 | 6/2011 |
| WO | WO-2011-101709 | 8/2011 |
| WO | WO-2012-158850 | 11/2012 |
| WO | WO-2013-171648 | 11/2013 |
| WO | WO-2013-186663 | 12/2013 |

OTHER PUBLICATIONS

International Application PCT/IB2013/054551 Search Report dated Oct. 14, 2013.
Cisco Systems Inc., "Multilink PPP for DDR—Basic Configuration and Verification," Document ID: 10239, Sep. 9, 2005 (9 pp.).
Conant, G.E., "Multilink PPP: One Big Virtual WAN Pipe," Published on Linux Journal (http:/www.linuxjournal.com), Sep. 1, 1999 (6 pp.).
Dejero, "Dejero Transforms Live Newsgathering," Jun. 7, 2010 (6 pp.).
European Patent Application No. 09704224.6 Official Action dated Nov. 17, 2011.
European Patent Application No. 12196907.5 Search Report dated Apr. 3, 2013.
European Patent Application No. 09704224.6 Office Action dated Feb. 3, 2014.
European Patent Application No. 137292421 Search Report dated Apr. 13, 2015.
European Patent Application No. 09704224.6 Official Action dated May 8, 2015.
JP Application No. 2013-191799 Office Action dated Apr. 30, 2014.
PCworld, "Do Web Accelerators Work," Jan. 27, 1999 (4 pp.).
Sklower et al., The PPP Multilink Protocol (MP), RFC 1990, Network Working Group, Aug. 1996 (22 pp.).
Smith, K., "Ascend's Multilink Protocol Plus (MP+)," RFC 1934, Network Working Group, Apr. 1996 (48 pp.).
TVU Networks, "Sharp, glitch-free picture quality from a compact video news gathering backpack," May 6, 2011 (4 pp.).
U.S. Appl. No. 12/965,879 Office Action dated Aug. 29, 2013.
U.S. Appl. No. 13/368,369 Office Action dated Aug. 29, 2013.
U.S. Appl. No. 13/713,001 Office Action dated Apr. 29, 2015.
U.S. Appl. No. 13/886,050 Office Action dated Aug. 12, 2013.
U.S. Appl. No. 13/921,227 Office Action dated Sep. 30, 2013.
U.S. Appl. No. 13/921,227 Office Action dated Feb. 21, 2014.
U.S. Appl. No. 14/588,939 Office Action dated Jul. 16, 2015.

* cited by examiner

APPARATUS FOR COOPERATING WITH A MOBILE DEVICE

PRIORITY CLAIM

This application claims priority under 35 U.S.C. §119 to U.S. Provisional Application No. 61/784,630, filed on Mar. 14, 2013, which is expressly incorporated herein by reference in its entirety.

TECHNICAL FIELD

The disclosed embodiments relate generally to an apparatus and method for transmitting a data stream, and more particularly but not exclusively for transmitting a data stream using several transceivers.

BACKGROUND

Many mobile devices operating on standard communication networks, such as cellular networks and WiFi networks, are limited in the areas in which they have coverage from their network operator and in their download/upload rate. In addition, even in areas that the mobile device has good service, a typical uploading rate for the mobile device in cellular networks and/or WiFi networks may not be sufficient for transmitting a video stream at a desired quality in close to real time.

SUMMARY

One embodiment of the disclosure may include an apparatus for cooperating with a mobile device having an embedded transceiver. The apparatus may include a housing, a mechanical connector configured to mechanically retain the mobile device, and at least one port within the housing for conveying energy to at least one auxiliary wireless transceiver associable with the apparatus, wherein the apparatus is configured to cooperate with the mobile device when the mobile device is retained on the housing by the mechanical connector, to enable transmission of a first portion of a data stream over the at least one auxiliary transceiver while a second portion of the data stream is simultaneously transmitted over the embedded transceiver.

Other aspects of the disclosure are set forth in the description which follows and are included in the appended claims, the entirety of which is incorporated into this Summary by reference.

BRIEF DESCRIPTION OF THE DRAWINGS

For a more complete understanding of the disclosure, reference is now made to the following detailed description taken in conjunction with the accompanying drawings wherein.

DETAILED DESCRIPTION

Figure 1:
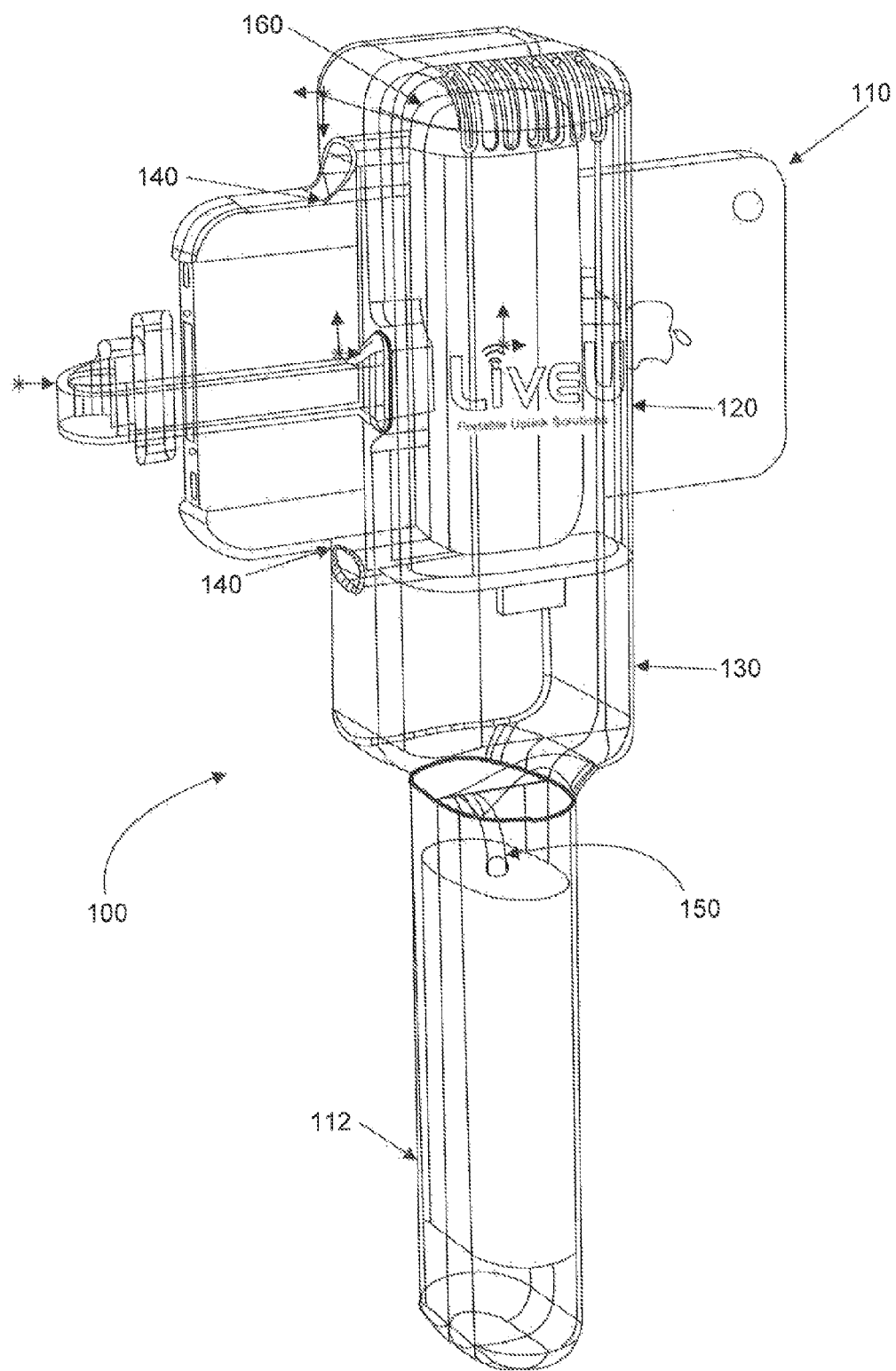
FIG. 1 is a diagrammatic representation of an exemplary apparatus according to some disclosed embodiments of the invention.

The following detailed description is provided by way of example and not intended to limit the scope of the invention in any way. Specific details in the described embodiments and exemplary apparatuses are set forth in order to provide a thorough understanding of the embodiments and the exemplary apparatuses. It should be apparent, however, that not all details are required in all embodiments of the invention. The scope of some embodiments of the invention are demarcated by the appended claims.

Devices consistent with this disclosure may have multiple uses, one of which may be to aid in real time streaming of live video via a mobile device such as a cell phone. In some instances, it may be difficult to transmit live video in real time or near real time, at a desired quality level and with a desired reliability. The mobile device may be retained within an apparatus having a handle. In one embodiment, the apparatus may include one or more auxiliary transmitters configured to receive portions of a video stream captured by a camera of the mobile device. Alternatively, the apparatus may be configured to receive a data stream, for example a video stream, an audio stream, or a media stream, from external devices, such as an external camera, recorder, telematics, monitors, medical devices, imaging devices, or other equipment.

In some embodiments, the apparatus may be configured to receive the data stream over wireless connection, such as, WiFi, Bluetooth, Wireless USB, Wireless High-Definition Multimedia Interface (HDMI), Coded Orthogonal Frequency Division Multiplexing (COFDM), etc. Alternatively, the apparatus may be configured to receive the data stream over a wired connection, such as, HDMI connection, Serial digital interface (SDI) connection, a standard camera connection, a USB connection, a proprietary connection, an Ethernet connection, etc. The data stream received from one or more sources, may be transmitted on its own, or combined with other data produced by the mobile device itself. For example, a portion of the video stream may be transmitted directly over a cellular network by the mobile device, and one or more additional portions of the video stream may be sent to the apparatus, and transmitted over other wireless channels, e.g., WiFi, a second cellular network, etc. All of these portions may be transmitted in a manner that permits the video to be reconstructed at a receiving location.

To power one or more transceivers within the apparatus, the apparatus may contain a battery. The battery may also provide auxiliary power to the mobile device. A mechanical connector may reliably secure the mobile device to the apparatus, and a handle may be provided to facilitate stable capture of video. In other words, handle may be configured to permit a user to simultaneously stabilize the housing and the camera of the mobile device. Depending on specific construction, a user holding the handle of apparatus may be able to transmit live HD video (or increased quality video) by splitting the video signal across multiple channels. The mobile battery may provide power for both the auxiliary transceivers and the mobile device, thereby increasing reliability. When the broadcast is complete, the user may remove the mobile device from its secure seat in apparatus and resume using the mobile device according to its customary usage.

FIG. 1 is a diagrammatic representation of an exemplary apparatus (100) cooperating with a mobile device (e.g., cell phone 110) having an embedded transceiver (120) according to some embodiments. Apparatus 100 may include a holding mechanism (e.g., handle 112), a housing (130), a mechanical connector (140) for mechanically retain cell phone 110, and at least one port (150) for conveying energy to at least one auxiliary wireless transceiver (160) associable with the apparatus. When cell phone 110 is retained on housing 130 by mechanical connector 140, apparatus 100 enables transmission of a first portion of a data stream over at least one auxiliary transceiver 160 while a second portion of the data stream is simultaneously transmitted over embedded transceiver 120.

In some embodiments an apparatus is provided for cooperating with a mobile device having an embedded transceiver. The term "mobile device" as used herein refers to any device configured to communicate with a wireless network, including, but not limited to a smartphone, tablet, mobile station, user equipment (UE), personal digital assistant, laptop, public safety Land Mobile Radio (LMR) terminals, e-Readers, dedicated terminals and any other device that enables mobile data communication. The term "transceiver" as used herein refers to any device capable of transmitting and/or receiving signals in a wireless network. For example, a transceiver can communicate with a cellular network, mobile telephony network, IP network, and even with mesh devices or peer-to-peer devices. While the invention, in its broadest sense, is not limited to any particular transceiver or communications protocol, embodiments of the invention may employ a transceiver that uses one or more of the following exemplary communication standards: GSM, GPRS, HSPA, Edge, LTE, LTE Advanced, HSPA, CDMA, CDMA Rev A, CDMA Rev B, WiMAX, WiFi, Bluetooth, COFDM, Wibro, Satellite BGAN, and satellite VSAT. Alternatively, embodiments of the invention may involve transceivers that use other known or future wireless protocols.

According to some embodiments consistent with the present disclosure, a data stream (e.g., a video stream) originating from a mobile device may be transmitted by at least two transceivers. The first transceiver may be a transceiver embedded in the mobile device, meaning a transceiver that is built into the mobile device itself (e.g., a cellular transceiver or a WiFi transceiver). The other at least one transceiver can be an auxiliary wireless transceiver associated with a separate apparatus (e.g., a cellular transceiver and a satellite transceiver). The term "auxiliary wireless transceiver" may refer to any transceiver associable with an apparatus, separate from the mobile device, other than any embedded transceiver of the mobile device. According to some embodiments, the auxiliary wireless transceiver can be a single-chip transceiver built into an apparatus for holding the wireless device, or in the alternative, the auxiliary wireless transceiver can be part of a stand-alone unit (e.g., a USB modem) that may be associated with the apparatus for holding the wireless device.

In some embodiments the apparatus includes a mechanical connector on the housing to mechanically retain the mobile device. As used herein, the term "mechanical connector", refers to any structure configured to hold a mobile device, and the term "housing" refers to any structure that provides support to the mechanical connector. Depending on design choice, the mechanical connector and the housing may be constructed of separate pieces or may be integrally formed. Mechanically retaining the mobile device means that the mechanical connector can maintain the mobile device (230) in a supported orientation. In some embodiments the mechanical connector can mechanically retain the mobile device without blocking or obstructing the field of view of its camera, and without interfering with some or all functions of the mobile device, e.g., front camera, back camera, touch screen, buttons, connector ports, etc. In order to retain the mobile device, the mechanical connector may use one or more of the following: a mount, an attaching member, a support surface, a holding arm, a jaw, a friction fit, a clamp, a clip, a suction cup, an adjustable frame, a locking mechanism or any combination thereof. One example of a housing and a mechanical connector is provided in FIG. 2.

Figure 2:
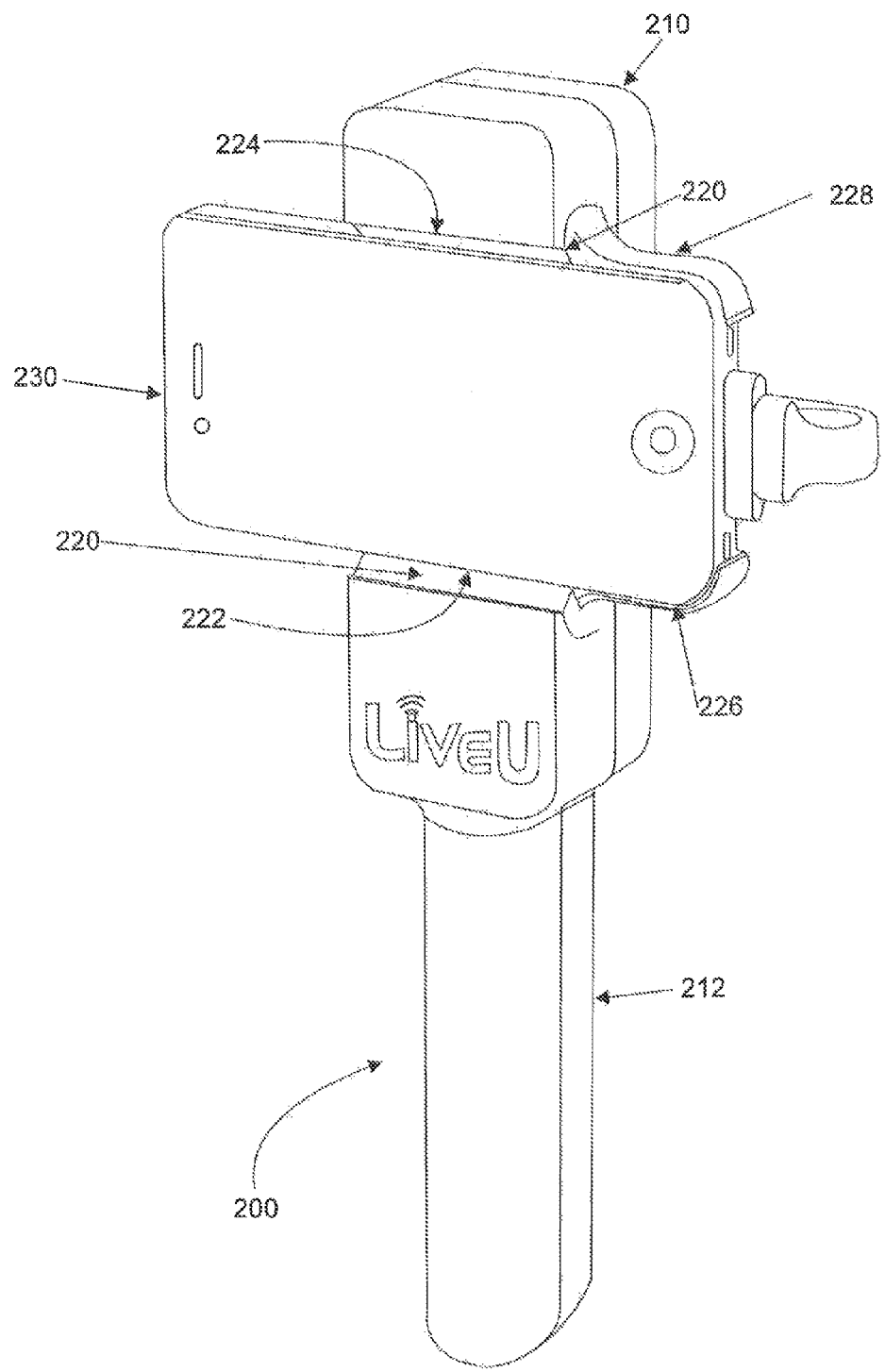
FIG. 2 is another diagrammatic representation of the exemplary apparatus according to some disclosed embodiments of the invention.

FIG. 2 is a diagrammatic representation illustrating an apparatus (200) that includes a housing (210) and a mechanical connector (220). In this example, housing 210 includes a holding mechanism (e.g. handle 212) for enabling a user to steadily direct the camera of the mobile device during data transmission. Housing 210 is coupled with mechanical connector 220 having two adjustable support surfaces (222 and 224) and two arms (226 and 228). Even with this embodiment, the arms may be omitted or additional arms or other securing elements may be added. The capability of rigidly fixing the image plane of mobile device 230, especially during the image capture, assists in outputting stable video stream and avoiding capturing blurry images. Arms 226 and 228 can be designed for detachably gripping a periphery of mobile device 230, for example arms 226 and 228 can be curved at their ends. Mechanical connector 220 can be constituted of a resilient material, such as synthetic plastic or metal, that yield to enable mobile device 230 to be snap-fitted to the mechanical connector. Alternatively, adjustable support surfaces 222 and 224 may be constructed in a jaw arrangement to permit those opposing surfaces to clamp onto the mobile device 230.

In addition, mechanical connector 220 can be configured such that the embedded transceiver in mobile device 230 and at least one auxiliary wireless transceiver associable with apparatus 200 are maintainable at a fixed distance from each other. For example, the embedded transceiver and an auxiliary wireless transceiver may be maintained (as long as mobile device 230 is retained by mechanical connector 220) at any fixed and predetermined distance between 1 inch and 10 inches, for example. In some embodiments mechanical connector 220 may be customized to hold a single type and model of the mobile device 230 (e.g., Samsung Galaxy S3™, IPhone™, IPad™). Alternatively, mechanical connector 220 can be adapted to be adjustable and to hold selectively hold a plurality of a differing mobile device 230 and/or differing models of a same mobile device.

As used herein, the term "holding mechanism" refers to any element constructed to be grasped or held by one or more hands of a user (e.g., a handle, a grip). As illustrated in FIGS. 1 and 2, handle 112 and 212 may have an elongated rod-like shape. However, the invention in its broadest sense is not so limited. A holding mechanism may be rounded with or without an opening in a center thereof; c-shaped, L-shaped, T-shaped, or may include any other shape that permits holding by a user. While the figures illustrate rigid holding mechanisms, holding mechanisms consistent with the disclosure may include flexible structures such as straps, bands or any other flexible structure that permits the apparatus to be reliably held in one or more hands of a user. Collectively, all of these various types of holding mechanisms may be referred to as a handle.

Handle 212 can be provided with an insert (not shown in the figures) having an internally threaded passage for threaded engagement with an industry standard threaded mounting stud to enable the apparatus 200 to be readily mounted on industry standard camera and video equipment mounting platforms, such as tripods. Apparatus 200 can further include a vehicle dashboard mount, part of the holding mechanism or separately, enabling the apparatus to be used remotely from the user of the mobile device. The apparatus may also include means to support remote wired and/or wireless control of itself and of the mobile device. According to some embodiments, the dimensions of apparatus 200 may enable it to be carried inside a handbag. For example, the length of the apparatus 200 can be less than 12 inches, and the weight of the apparatus can be less than 2 Kg. The materials and components of apparatus 200 may enhance Radio Frequency (RF) performance of the embedded transceiver and, may facilitate heat dissipation, and provide additional protection to mobile device and against diverse environmental conditions (such as shocks, vibration, humidity, dust, heat, cold, etc.) Heat dissipation may occur by constructing the housing 210 as a heat sync, or by including venting in the housing or in spaces around the holding area for air passage.

In some embodiments the apparatus includes at least one port in the housing for conveying energy. The term "port" as used herein refers to an interface between a power source and circuitry of the apparatus. The port can be a permanent interface between the power source and the circuitry of the apparatus, or a temporary interface e.g., the port may be associated with the power source. For example, in some embodiments where the battery is removable, the port may include a battery connector having contacts for engaging contacts on the battery when the battery is installed. Alternatively, the port may be a permanent wired connection between the battery and internal circuitry of the apparatus.

The port can be used for conveying energy from the power source to the at least one auxiliary wireless transceiver. In addition, the port can be used for conveying energy from the power source to the mobile device. Consistent with embodiments of the present disclosure, energy conveyance may be direct or indirect. Direct conveyance occurs when the power source is directly connected to component to be powered (e.g., a transceiver). Indirect conveyance may occur when power is transmitted via intermediate components or circuitry. Both qualify as "conveying energy" within the meaning of this disclosure. If the port is used for conveying energy to the mobile device, the apparatus can include an electrical connector for enabling power transmission from the port to the mobile device. The electrical connector may include any conductive cable, e.g., the electrical connector may be connected directly to the port or connected indirectly through circuitry of the apparatus.

The term "circuitry" as used herein refers to all of the following: (a) hardware-only circuit implementations, such as implementations in only analog and/or digital circuitry (e.g., wires, electric connection), and (b) combinations of circuits, software and/or firmware (e.g., a combination of processors, digital signal processors, software, and memories that work together to cause an apparatus to perform various functions), and (c) circuits (e.g., a microprocessor or a portion of a microprocessor, that require software or firmware for operation, even if the software or firmware is not physically present). The power source connectable to the port can be an external power supply (e.g., a regular AC power supply, a DC vehicle power supply). Alternatively, the power source may be battery located within the housing connectable directly or indirectly to the port (e.g., a rechargeable battery). The term "battery" as used herein broadly refers to any device that can repeatedly store and dispense electric power, including but not limited to chemical batteries (e.g., a lead-acid battery, a lithium ion battery, a nickel-metal hydride battery, a nickel-cadmium battery). In case the apparatus is powered directly by a vehicle power supply, the apparatus may contain electronic components to regulate and stabilize incoming spiky and unstable DC power supply such as comes directly from 12 VDC vehicle power supply. In case the apparatus is powered by a battery, the apparatus may be configured to extend operation time of the mobile device by at least 30 minutes (e.g., one hour or two hours) of continuous video transmission.

Figure 3:
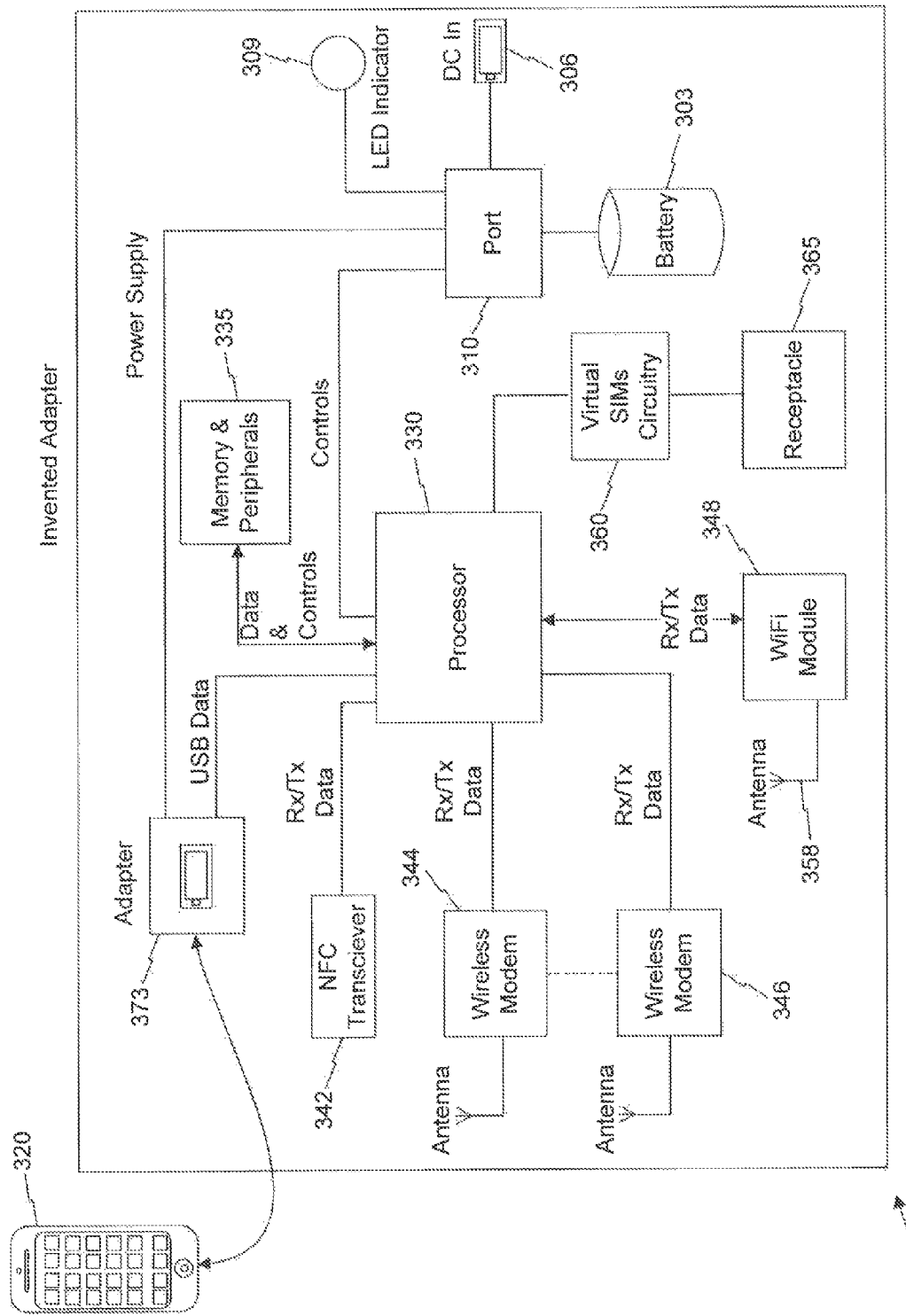
FIG. 3 is a block diagram that illustrates the circuitry of an exemplary apparatus according to some embodiments of the invention.

FIG. 3 is a block diagram illustrating circuitry of an exemplary apparatus (300) according to some embodiments. Apparatus 300 can be powered by a battery (303) and/or an external power source (306), both of which are connectable to a port (310), which might simply be a hardwire, or might include a selective connector. In case battery 303 is a rechargeable battery, external power source 306 may be used to recharge battery 303. A light-emitting diode (LED) indicator (309), such as bi-color LED, may indicate that the battery is charged, or that external power source 306 is plugged in. The energy from battery 303 and/or external power source 306 can be conveyed to an electrical connector (316) connected via an adapter (313) to power/charge a mobile device (320). Electrical connector 316 may also be used for exchanging of information between mobile device 320 and at least one processor. In a different configuration, electrical connector 316 may be connected to a communication port associated with the housing (not shown in FIG. 3). For example, electrical connector 316 may be a USB cable that supports data-transfer rates of 480 Mbps to transmit a data stream and used to charge mobile device 320.

In some embodiments, apparatus 300 includes at least one processor (e.g., processor 330). The term "processor" as used herein refers to any physical device having an electric circuit that performs a logic operation on input or inputs. For example, processor 330 may include one or more integrated circuits, microchips, microcontrollers, microprocessors, all or part of a central processing unit (CPU), graphics processing unit (GPU), digital signal processor (DSP), field-programmable gate array (FPGA) or other circuits suitable for executing instructions or performing logic operations. Processor 330 may be configured to communicate with the mobile device and other electronic components (e.g., a transceiver) within the apparatus and to control at least one of the components of the apparatus. The instructions executed by processor 330 may be pre-loaded into a memory unit integrated with embedded into processor 330, or stored in a separate memory unit (335) having an erasable and non-erasable memory banks, such as a RAM, a ROM, or a hard disk. In the alternative, the instructions executed by processor 330 may be received from mobile device 320, i.e., mobile device 320 or an application pre-installed on the mobile device can control the operation of the processor 330 by sending processor 330 instructions via one of the apparatus' auxiliary wireless transceivers or via electrical connector 316. Some of the logic operations processor 330 may be configured to preform are: local circuitry management, handshake with mobile device 320 over the wired and wireless links, a user authentication, data encryption/decryption, virtual SIMs implementation, battery charging control, battery status report via LED indicator 309, power management, processing of connectivity detection, auxiliary wireless transceivers management, auxiliary wireless transceivers connectivity management (with their respective networks), user interface management, and audio processing such as digitization. While, for ease of illustration, FIG. 3 illustrates a single processor, it should be understood that, consistent with embodiments of the invention, functionality may occur in a single processor or may be split among multiple processors.

In the example illustrated in FIG. 3, processor 330 is connected to four transceivers (342, 344, 346, and 348). Transceiver 342 may be a Near Field Communication (NFC) transceiver dedicated to communicating with mobile device 320. For example, transceiver 342 may receive a data stream or a portion of a data stream from mobile device 320. Transceivers 344 and 346 may be cellular transceivers for communicating with at least one cellular network. In one embodiment transceiver 344 communicates with a first cellular network and transceiver 346 communicates with a second different cellular network. The first cellular network and the second cellular network can differ in their technology (e.g., the first cellular network can be a GSM network, and the second cellular network can be an LTE network). Alternately, the first cellular network and the second cellular network can work with the same technology and still be different in their service provider. Transceiver 348 may be a WiFi transceiver for communicating with any device providing Internet access over a wireless local area network. Transceivers 344, 346, and 348 may be respectively associated with antennas (354, 356, and 358).

The term "antenna" as used herein means any radiating element (or multiplicity of radiating elements) that is capable of receiving electromagnetic radiation and generating an electrical signal therefrom. For example, the term "antenna" includes an RF antenna, a multiple-input and multiple-output (MIMO) antenna, an antenna set, an antenna array, a beam forming antenna, a multi-frequency antenna, a multi-band antenna, or any RF device. In one embodiment the term "antenna" include also at least one processing unit that supports the RF connectivity or physical layer connectivity required to establish wireless communication, e.g., cellular, satellite, WiFi, etc. Antennas 354, 356, and 358 may, by way of example only, have a gain of at least −5 dBi, a processing gain of at least −5 dBi, a gain of at least −10 dBi, a processing gain of at least −10 dBi, a gain of at least −15 dBi, or a processing gain of at least −15 dBi. Antennas 354, 356, and 358 may also be used as a performance boosting antenna for mobile device 320 to enhance the communications capabilities and resiliency of mobile device 320. For example, apparatus 300 may provide the user of mobile device 320 the ability to switch between different networks in order to provide the user basic services (such as voice and SMSs), at high availability in areas of limited coverage or service by any one of the networks.

In some embodiments, apparatus 300 may include at least one power regulator (not shown in the FIG. 3). The term "power regulator" includes any device capable of reducing a power usage of at least one device or component. For example, a power regulator can receive at least one control signal from the mobile device and reduce the power usage by the at least one auxiliary transceiver during certain periods. The power regulator may receive a control signal from the mobile device when no data stream or a portion of data stream is received by the apparatus, or when there is no intention to transmit any data stream. Alternatively, the power regulator may be pre-programed to reduce the power usage by the at least one auxiliary transceiver based on events other than the control signals from the mobile device (e.g., end of transmission, low performance of transceiver etc.). Apparatus 300 may include at least one peripheral connector (also not shown in the FIG. 3), for enabling connection of apparatus 300 to other devices e.g., via Ethernet, microphones, speakers, Bluetooth transceiver, etc.

In some embodiments, processor 330 may be further connected to a virtual Subscriber Identity Module (SIM) circuitry (360) associated with a receptacle (365) for containing at least one wireless identification card. The term "receptacle" as used herein refers to an object or space used to contain at least one SIM card or any removable memory that functions as a SIM card. While receptacle 365 is illustrated as a single component, it may include multiple components. For example, receptacle 365 may include one or more components configured to hold multiple SIM cards, micro SIM cards, and/or o nano SIM cards. For example, receptacle 365 may enable auxiliary transmission of data over one, two, three, four, five, six, seven, or eight wireless channels. Processor 330 may be configured to receive wireless service/authentication credentials, associated with but not limited to the following standards: USIM, RSIM, GSM, WiFi. The wireless service/authentication credentials may be associated with a plurality of different wireless service providers and enable wireless communication depending on the wireless credentials received. The term "credentials" refers to any information that can be stored and functionally used in place of a SIM card. These credentials may be downloaded to the apparatus 300 via any of its auxiliary wireless transceivers (342, 344, 346, and 348) or downloaded to mobile device 320 and transmitted to apparatus 300 using electrical connector 316. Additionally, the downloaded credentials may also be used by mobile device 320 instead of its own credentials, in order to avoid roaming charges. Virtual SIM circuitry 360 may store a plurality of fixed credentials (or regularly download and store temporary credentials) to be used by one of the wireless transceivers.

In other embodiments, processor 330 may be configured to authorize a pairing of a specific mobile device with the apparatus, or authorize a pairing of a pre-defined number of specific mobile devices. The term "pairing" as used herein may mean, for example, that the mobile device and the apparatus have exchanged a protected passkey in order to establish a trusted connection. The authorization of pairing of specific mobile devices may be desired to enable only pre-registered mobile devices usage of apparatus 300. The authorization procedure may include validating authenticating information of mobile devices, for example: specific numbers (serial ID, SIM ID etc.), bonding software ID, and license requirements. In some embodiments the authenticating information may be stored in memory unit 335, in addition, processor 330 may be configured to use the authenticating information to determine if the usage of the apparatus is according to policies and algorithms. Apparatus 300 may also include a user interface (e.g., LED, touchscreen) to control at least one function of the apparatus e.g., to select which auxiliary wireless transceiver to use.

In one embodiment, at least one of the auxiliary wireless transceivers of the apparatus is a transceiver in a dedicated network such as an ad-hoc mesh network or a COFDM network (i.e., not a cellular network). In this embodiment the typical user may include public safety personnel, military personnel, municipality workers, etc. The software running on the mobile device may use both a network associated with its embedded transceiver and a network associated with the auxiliary wireless transceiver. In the alternative, the mobile device may prefer one network over the other, or may switch from one to the other according to availability and coverage, as per various control indications and policies and algorithms. The processor of the apparatus can execute encryption/decryption algorithms and protocols, so that any part of the communication exchanged (transmit/received) over one of the auxiliary wireless transceivers is encrypted/decrypted. The apparatus may enable the user of the mobile device to select between a secure communication and an open communication. By encrypting a part of the communication, an additional security and data protection for any bonded usage, including of voice, may be provided.

Figure 4:
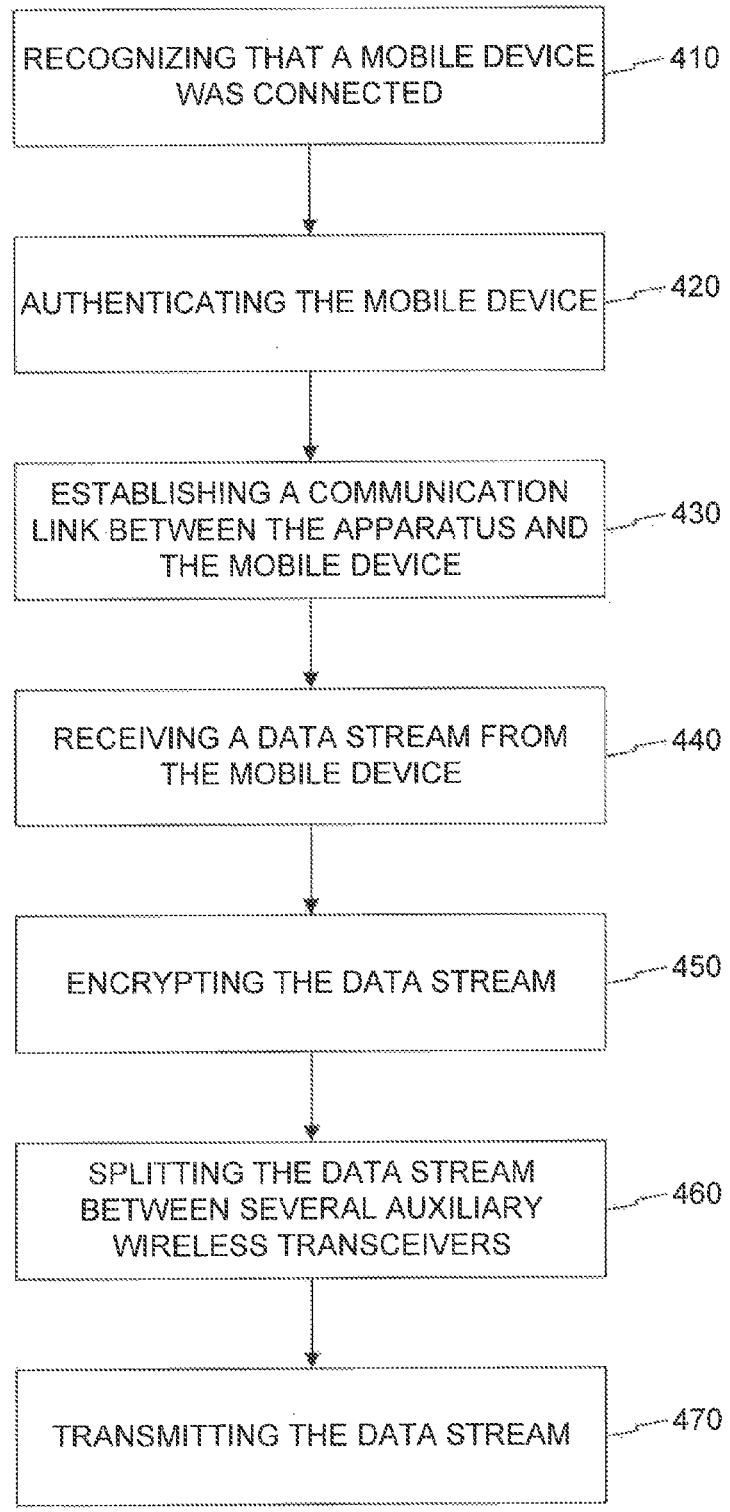
FIG. 4 is a flow chart of an exemplary method for using an apparatus consistent with some embodiments of the invention.

Flow chart 400 in FIG. 4 represents an exemplary method for using an apparatus consistent with some embodiments. Step 410 includes recognizing that a mobile device was connected using any switch known in the art (e.g., a mechanical switch, a piezo electric switch, a photo-electric switch, wireless switch, etc.). According to one embodiment before the mobile device is connected to the apparatus, some or all of the apparatus circuitry can be at power down state. A standby mode may allow minimal power discharge from the power source e.g., embedded battery. The processor may continuously sense the mobile device wired bus activity (even in standby mode). Step 420 is an optional step that includes authenticating the mobile device. The processor may perform an authentication phase for the mobile device, in order to verify that the mobile device is licensed to use the apparatus. The processor may use an NFC path as a part of the authentication phase, and/or as a secondary authentication measure. If such license exists, the processor can power up all circuitry, or power control of all parts of the circuitry as a result of a specific application decision. The power control may include, but is not necessarily limited to:

Turning off some or all the wireless communication links due to either poor coverage or more than enough bandwidth;

Turning off some or all the wireless communication links due to a low battery power condition; and Turning off/on the apparatus periodically or per a specific event, based on remote manager commands.

The power control and the power save modes can extend the operation time and enable remote controlled operation. This may be useful if the apparatus is powered by a battery. After the optional authentication and upon completion of the boot-up, the processor, along with the other electronic devices, may establish a communication link between the apparatus and the mobile device in step 430. The communication link may wirelessly use one of the auxiliary wireless transceiver (e.g., the NFC transceiver). Alternatively, the communication link may be a physical connection using an electrical connector that may be connected to a communication port. Step 440 includes receiving a data stream from the mobile device. The data stream may be a video stream, a portion of live video stream, a portion of an audio stream, and/or any other data transmission. Step 450 is an optional step, that includes encrypting the data stream. The processor may be configured to encrypt (or decrypt) the data stream before (or after) it is transmitted to (or from) a public network, in order to enhance the transmitted data authenticity, privacy, and security. Step 460 is also an optional step, that includes splitting the data stream between several auxiliary wireless transceivers. In case the apparatus has more than one auxiliary wireless transceiver, the processor may split the data stream (or part of the data stream) between all of a plurality of auxiliary wireless transceivers. Each auxiliary wireless transceiver may be equipped with a specially designed RF antenna in order to improve the wireless network Signal Noise Ratio (SNR), and associated efficiency. In addition, each transceiver can register itself to its network by either using its attached SIM secret key, or by acquiring (with the processor assistance) a virtual SIM with a secret key. Once the wireless network registration has been completed and the transceiver is connected to the public network, the data stream may be transmitted in step 470.

Figure 5:
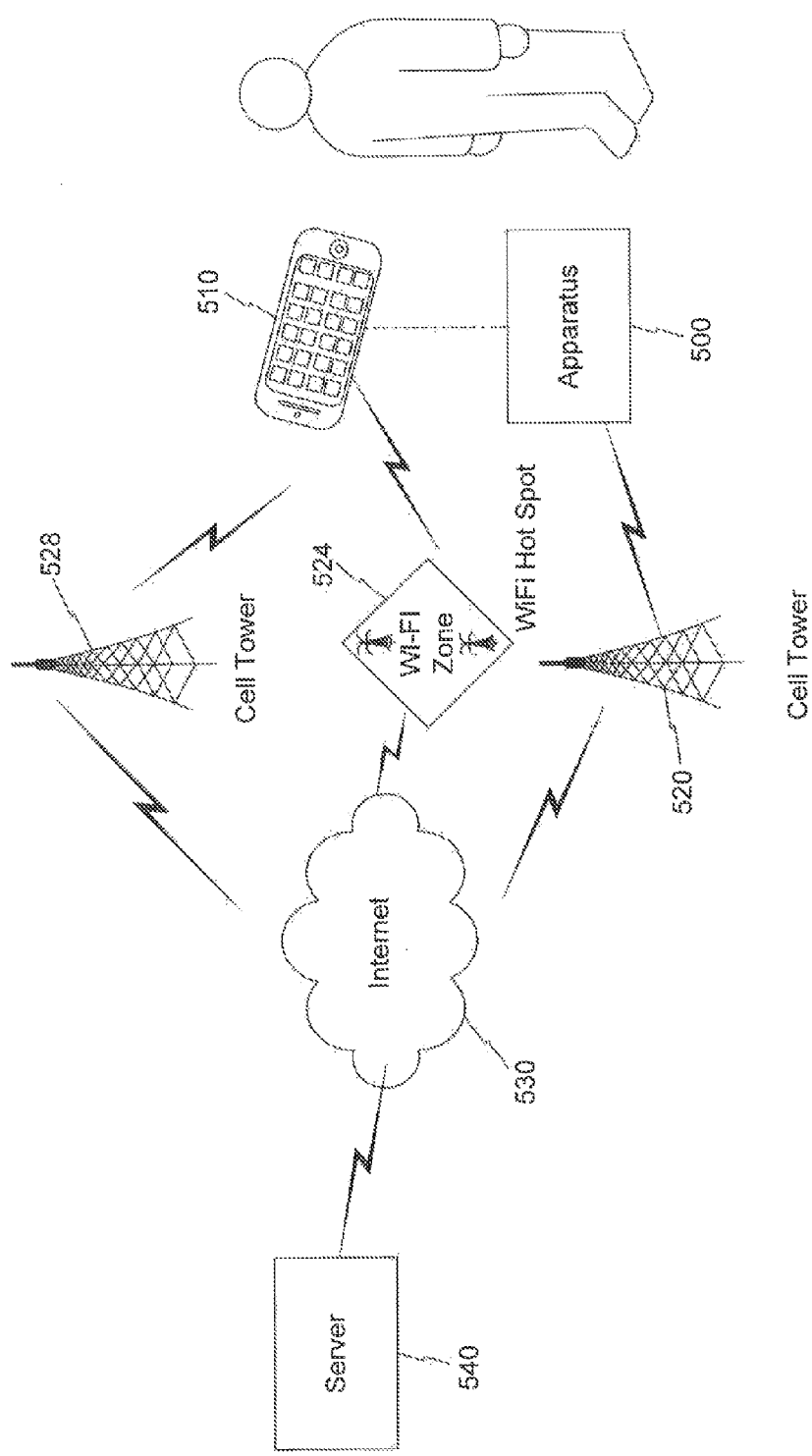
FIG. 5 is a diagrammatic representation which depicts the flow work of an exemplary apparatus according to some embodiments of the invention.

FIG. 5 is a diagrammatic representation illustrating a work flow of an exemplary apparatus according to some embodiments. According to one exemplary embodiment, in order for apparatus 500 to work, mobile device 510 must be retained in apparatus 500 and maintain a fixed distance from the auxiliary wireless transceiver. In an alternative embodiment illustrated in this figure, mobile device 510 can communicate wirelessly with apparatus 500, and the distance between the mobile device and the auxiliary wireless transceiver is changeable. Mobile device 510 can communicate with apparatus 500 with any commercial standard wireless protocol or wired protocol over a commercial standard connector, for example: Wireless Ethernet, WiFi, Bluetooth, Zigbee, WiGig, Wireless Personal Area Network, NFC, USB, HDMI, mobile devices docking connectors, Apple Lightning connector, Apple External Accessory connector protocols such as MFi, Samsung Galaxi Tab connector. In some cases mobile device 510 can communicate with apparatus 500 using a commercial standard wireless protocol even when they are physically connected. Several wireless communication routes may be used simultaneously to transmit a data stream from the mobile device, the difference in the wireless communication routes may result from different wireless transceivers used. The terms simultaneous and simultaneously, as used herein in connection with data transmission, indicates that there is at least some overlap in time when multiple data streams are transmitted. For example, if there is at least a slight overlap in time between when one auxiliary transceiver transmits the first portion and when an embedded transceiver transmits the second portion, those two transmissions are considered "simultaneous". Consistent with this disclosure, mobile device 510 and apparatus 500 may have any type of wireless transceiver, for example: a GSM transceiver, a GPRS transceiver, an HSPA transceiver, an LTE transceiver, an LTE Advanced transceiver, a CDMA transceiver, a COMA Rev A transceiver, a CDMA Rev B transceiver, a WiMAX transceiver, a WiFi transceiver, a COFDM transceiver, a satellite BGAN transceiver, and a satellite VSAT transceiver.

In some embodiments, a software pre-installed in a mobile device (e.g., LU-Smart mobile app) can instruct at least one processor of the mobile device to split a data stream into several portions, such that each portion will be transmitted concurrently (or substantially concurrently) via differing wireless communication routes. This functionality may be important when the data stream to be transmitted is a live video stream. In the example illustrated in FIG. 5, the processor of the mobile device splits the data stream into three portions and uses the combination of the mobile device embedded transceivers and an auxiliary wireless transceiver as a virtual broadband upload connection. The first portion is transmitted from the at least one auxiliary wireless transceiver of the apparatus via a first cellular network (520). The second portion is concurrently transmitted from a first embedded transceiver of the mobile device via a second cellular network (528). The third portion is concurrently transmitted from a second embedded transceiver of the mobile device (a WiFi transceiver) via a mobile hot spot (524). All three portions of the data stream can be transmitted via the Internet (530) to a bonding server (540) that reconstructs the three portions into one data stream. Apparatus 500 can transmit the first portion of the data stream in a manner enabling the data stream (e.g., a live video stream captured by a camera of the mobile device) to be reconstructed at bonding server 540 from all the portions of the data stream substantially close to real time. Reconstructing the portions into one data stream means that the original data stream is assembled from all the portions and ready for use (e.g., in case the data stream is a video stream the reconstructed video stream can be displayed). In one embodiment the first portion of data stream may include data packets that are also included in the second portions of data stream. The processor of mobile device 510 may inequitably distribute the data stream, such that the first portion may be larger than the second portion. For example, when the performance of the embedded transceiver is less than the combined performance of the auxiliary wireless transceivers, in specific situations (e.g., the embedded transceiver has no reception) all of the portions of the data stream may be transmitted via the auxiliary wireless transceivers. The processor(s) in the apparatus or in the mobile device may be configured to load balance outgoing data streams in order to ensure timely reconstruction at a receiving location.

While the foregoing paragraph describes a three way split of data streams, the split may be two ways or may be more than three ways, depending on the number of additional channels made available through apparatus 500. Each additional SIM card or virtual SIM card provided through apparatus 500 may provide an additional opportunity to split the data stream.

For example, in accordance with some embodiments, apparatus 500 can be configured to retain at least two co-located auxiliary wireless transceivers. In one embodiment (not shown in the figure) apparatus 500 can further split the first portion of the data stream to at least two sub-portions and transmit each sub-portion via a different wireless communication route. For example, apparatus 500 can have two auxiliary wireless transceivers, and the processor of apparatus 500 can split the first portion of the data stream received from mobile device 510 to two sub-portions. In one instance, the at least one processor is configured to distribute the first sub-portion and the second sub-portion in a manner permitting reconstruction of the data stream (e.g., the live video stream) at a receiver (e.g., a bonding server 540) when the first sub-portion is distributed to the receiver via a satellite communication network, and the second sub-portion is distributed to the receiver via a cellular communication network. In another instance, the first sub-portion is distributed to the receiver via a first cellular communication network and the second sub-portion is distributed to the receiver via a second cellular communication network. According to some embodiments, the at least one processor is further configured to inequitably distribute the first sub-portion to the first auxiliary wireless transceiver and second plurality of packets to the second auxiliary wireless transceiver. In this situation, more data packets may be transmitted via the first wireless communication route than via the second wireless communication route. An example of when the at least one processor may inequitably distribute the sub-portions is when the at least one performance factor of the first wireless communication route is higher than the at least one performance factor of the second wireless communication route. The at least one performance factor can be: bandwidth, modem speed, modem reliability, operating license limitations, network congestion, modem error rate and connection quality.

Figure 6:
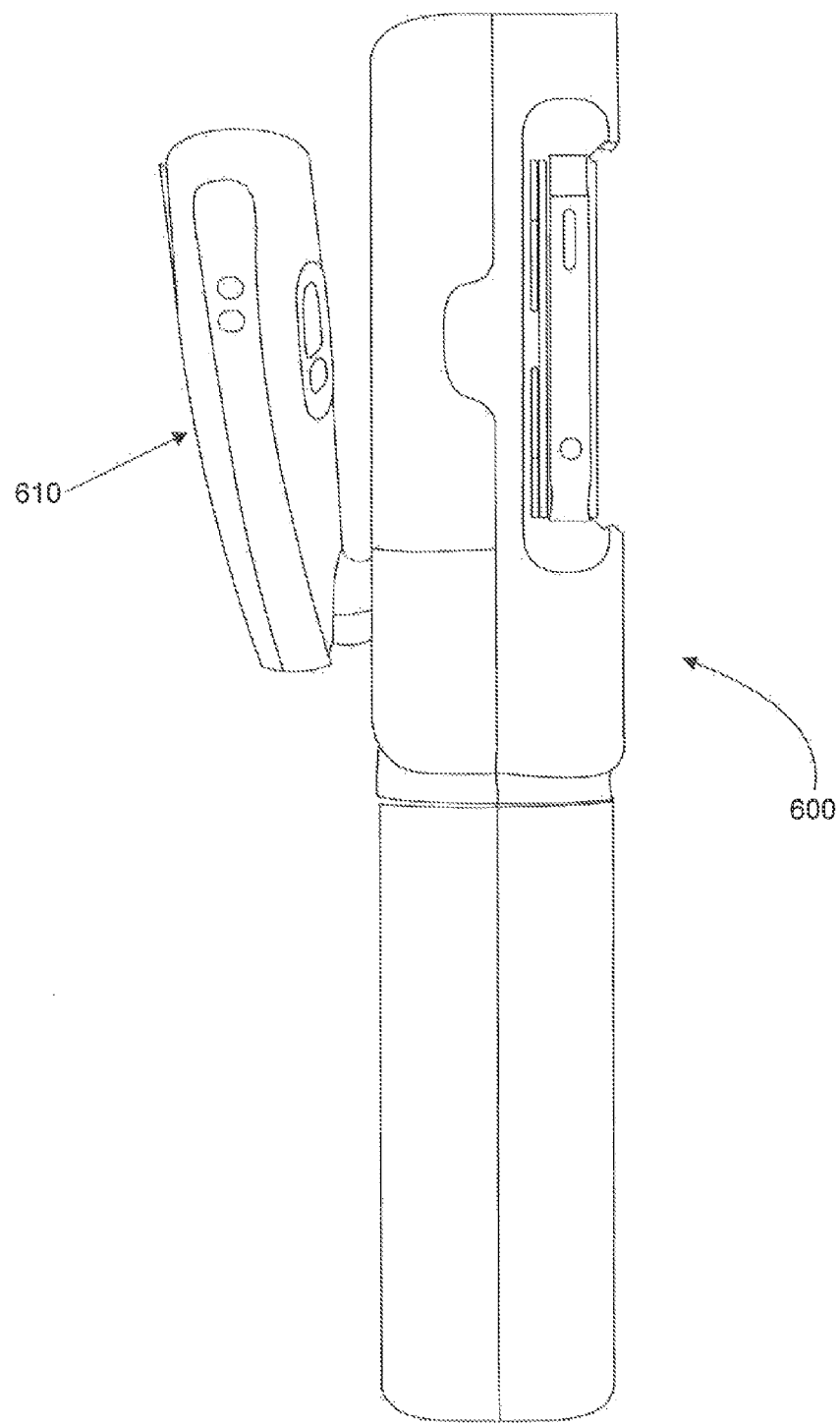
FIG. 6 is a diagrammatic representation of another exemplary apparatus according to a different embodiment of the invention.

FIG. 6 is a diagrammatic representation of an exemplary apparatus (600) according to a different embodiment. In this embodiment one of the at least one auxiliary wireless transceiver (610) is a USB modem that is sold separately from apparatus 600. The processor of apparatus 600 may be configured to register auxiliary wireless transceiver (610) and to use it according to the ethods and embodiments described above.

The following claims are incorporated in this description and constitute separate embodiments of the invention.

What is claimed is:

1. An apparatus for cooperating with a mobile device having an embedded transceiver, the apparatus comprising:
   a housing;
   a mechanical connector on the housing, the mechanical connector being configured to mechanically retain the mobile device;
   at least one port within the housing for conveying energy to at least one auxiliary wireless transceiver associable with the apparatus, wherein the apparatus is configured to cooperate with the mobile device when the mobile device is retained on the housing by the mechanical connector, to enable transmission of a first portion of a data stream over the at least one auxiliary transceiver while a second portion of the data stream is simultaneously transmitted over the embedded transceiver.

2. The apparatus of claim 1, further comprising a holding mechanism and wherein the mechanical connector is configured to retain the mobile device in a manner enabling a camera of the mobile device to be unobstructed by the apparatus, and wherein the holding mechanism is configured to permit the camera of the mobile device to be aimed by a user.

3. The apparatus of claim 1, further including an electrical connector for enabling power transmission from the port to the mobile device.

4. The apparatus of claim 1, further comprising a rechargeable battery within the housing, the rechargeable battery being connectable to the port.

5. The apparatus of claim 1, further comprising circuitry for conveying energy to power the mobile device.

6. The apparatus of claim 1, further comprising at least one power regulator within the housing, the power regulator being configured to receive at least one control signal from the mobile device.

7. The apparatus of claim 6, wherein the at least one power regulator is configured to receive at least one power reduction control signal to enable reducing a power usage by the at least one auxiliary transceiver during periods when the first portion of the data stream is not received by the at least one auxiliary transceiver.

8. The apparatus of claim 1, further comprising the at least one auxiliary wireless transceiver contained within the housing.

9. The apparatus in claim 8, wherein the housing includes a receptacle for containing at least one wireless identification card.

10. The apparatus of claim 1, further comprising an antenna associated with the at least one auxiliary transceiver, the antenna has a gain of at least −5 dBi.

11. The apparatus of claim 1, wherein the housing is configured to retain at least two auxiliary wireless transceivers.

12. The apparatus of claim 11, further comprising at least one processor within the housing, the at least one processor configured to split the first portion of the data stream between the at least two auxiliary wireless transceivers.

13. The apparatus of claim 1, further comprising at least one processor within the housing, the at least one processor configured to communicate with the mobile device and other electronic components within the apparatus and to control at least one of the components of the apparatus.

14. The apparatus of claim 13, wherein the at least one processor is configured to receive credentials associated with a plurality of differing wireless service providers, and to enable wireless communication depending on the wireless credentials received.

15. The apparatus in claim 13, wherein the at least one processor is configured to authorize a pairing of a specific mobile device with the apparatus.

16. The apparatus of claim 1, wherein the housing further comprises an insert having an internally threaded passage for threaded engagement with a threaded mounting stud of a tripod.

17. The apparatus of claim 1, wherein the housing further comprises a vehicle dashboard mount.

18. The apparatus of claim 1, wherein the apparatus is configured to be powered by a direct current vehicle power supply of at least 12 VDC.

19. The apparatus of claim 1, further comprising a communication port associated with the housing for enabling an exchange of information between the mobile device and the apparatus.

20. The apparatus of claim 1, wherein the apparatus is further configured to enable the first portion of the data stream and the second portion of the data stream to be transmitted in a manner permitting the data stream to be reconstructed at a receiver.

21. The apparatus of claim 1, wherein the data stream is a live video stream.

22. The apparatus of claim 1, where the mechanical connector is configured to retain the mobile device in a manner permitting a camera of the mobile device to collect images while the mobile device is retained by the mechanical connector, and wherein the housing further includes a holding mechanism for enabling a user to direct the camera during data transmission.

23. An apparatus for cooperating with a mobile device having an embedded transceiver, the apparatus comprising:
   a housing;
   a mechanical connector on the housing, the mechanical connector being configured to mechanically retain the mobile device in a manner enabling a field of view of a camera of the mobile device to be unobstructed by the apparatus;
   at least one port within the housing for conveying energy to at least one auxiliary wireless transceiver associable with the apparatus, wherein the apparatus is configured to cooperate with the mobile device when the mobile device is retained on the housing by the mechanical connector, to enable transmission of a first portion of a data stream over the at least one auxiliary transceiver while a second portion of the data stream is simultaneously transmitted over the embedded transceiver; and
   a handle connected to the housing for enabling the housing to be held by a user in a manner permitting the user to simultaneously stabilize the housing and the camera of the mobile device, while permitting the camera of the mobile device to be aimed by the user.

* * * * *